(12) United States Patent
Yamazaki

(10) Patent No.: US 9,355,046 B2
(45) Date of Patent: May 31, 2016

(54) INFORMATION PROCESSING APPARATUS, INFORMATION PROCESSING METHOD, AND COMPUTER-READABLE MEDIUM

(71) Applicant: CANON KABUSHIKI KAISHA, Tokyo (JP)

(72) Inventor: Daisuke Yamazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 13/683,629

(22) Filed: Nov. 21, 2012

(65) Prior Publication Data

US 2013/0212602 A1 Aug. 15, 2013

(30) Foreign Application Priority Data

Feb. 15, 2012 (JP) ................................. 2012-031046

(51) Int. Cl.
*G06F 13/10* (2006.01)
*G06F 3/12* (2006.01)
*H04N 1/00* (2006.01)

(52) U.S. Cl.
CPC ............ *G06F 13/102* (2013.01); *G06F 3/1204* (2013.01); *G06F 3/1206* (2013.01); *G06F 3/1228* (2013.01); *G06F 3/1254* (2013.01); *G06F 3/1285* (2013.01); *H04N 1/0044* (2013.01); *H04N 1/00424* (2013.01); *H04N 1/00474* (2013.01); *H04N 1/00482* (2013.01); *H04N 1/00949* (2013.01); *H04N 1/00204* (2013.01); *H04N 1/00427* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 5,777,616 A * | 7/1998 | Bates et al. | 715/837 |
| 5,801,700 A | 9/1998 | Ferguson | 345/349 |
| 5,862,321 A * | 1/1999 | Lamming et al. | 709/200 |
| 7,052,192 B2 | 5/2006 | Uchida | |
| 7,272,796 B2 | 9/2007 | Sano et al. | |
| 7,505,164 B2 | 3/2009 | Uchida | |

(Continued)

FOREIGN PATENT DOCUMENTS

| | | |
|---|---|---|
| CN | 1280705 A | 10/2006 |
| JP | 2005-190167 A | 7/2005 |

(Continued)

OTHER PUBLICATIONS

"HP Linux Imaging and Printing (HPLIP) Help," HPLIP Release 3.12.2 Distribution, Feb. 7, 2012, pp. 1-4, XP055089228.

(Continued)

*Primary Examiner* — Shih-Wei Kraft
(74) *Attorney, Agent, or Firm* — Fitzpatrick, Cella, Harper & Scinto

(57) ABSTRACT

An information processing apparatus comprises: a display unit configured to display, on a display device, a virtual device object to which a first object of a first device driver corresponding to a first output function of an output apparatus and a second object of a second device driver corresponding to a second output function of the output apparatus are assigned; and an acceptance unit configured to accept a data output instruction to the displayed virtual device object, wherein when the data output instruction to the virtual device object is accepted, said display unit displays information capable of accepting an output instruction to one of the first output function and the second output function.

12 Claims, 16 Drawing Sheets

(56) References Cited

U.S. PATENT DOCUMENTS

| | | |
|---|---|---|
| 7,827,493 B2 | 11/2010 | Sano et al. |
| 2002/0131065 A1* | 9/2002 | Sweetland et al. ........... 358/1.13 |
| 2003/0084132 A1* | 5/2003 | Ohta ............................. 709/221 |
| 2004/0034862 A1* | 2/2004 | Kadota ......................... 719/321 |
| 2004/0051912 A1* | 3/2004 | Schlank et al. ............... 358/468 |
| 2004/0125145 A1 | 7/2004 | Sano et al. |
| 2004/0213614 A1 | 10/2004 | Uchida |
| 2004/0250265 A1* | 12/2004 | Suzuki et al. ................. 719/321 |
| 2006/0072140 A1* | 4/2006 | Mitani ......................... 358/1.13 |
| 2006/0146368 A1 | 7/2006 | Uchida |
| 2006/0218501 A1 | 9/2006 | Wilson et al. |
| 2007/0198845 A1* | 8/2007 | Morikawa .................... 713/182 |
| 2008/0022221 A1 | 1/2008 | Sano et al. |
| 2008/0030762 A1* | 2/2008 | Morita ......................... 358/1.14 |
| 2009/0158301 A1* | 6/2009 | Holan et al. .................. 719/321 |
| 2009/0327955 A1* | 12/2009 | Mouilleseaux et al. ...... 715/810 |
| 2010/0245881 A1* | 9/2010 | Oishi ........................... 358/1.13 |
| 2011/0016404 A1 | 1/2011 | Sano et al. |

FOREIGN PATENT DOCUMENTS

| | | |
|---|---|---|
| JP | 2006-215725 A | 8/2006 |
| JP | 2007-122521 A | 5/2007 |
| JP | 4077996 B2 | 4/2008 |
| JP | 2010-244099 A | 10/2010 |
| KR | 10-2003-0013444 A | 2/2003 |

OTHER PUBLICATIONS

Jul. 1, 2015 Chinese Official Action in Chinese Patent Appln. 201310046010.4.

* cited by examiner

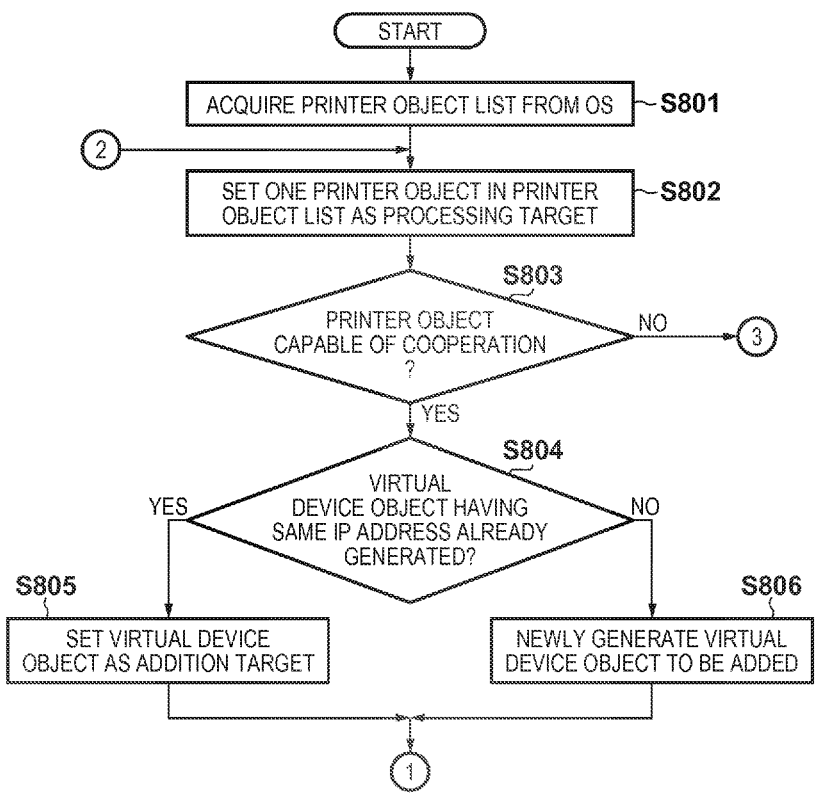

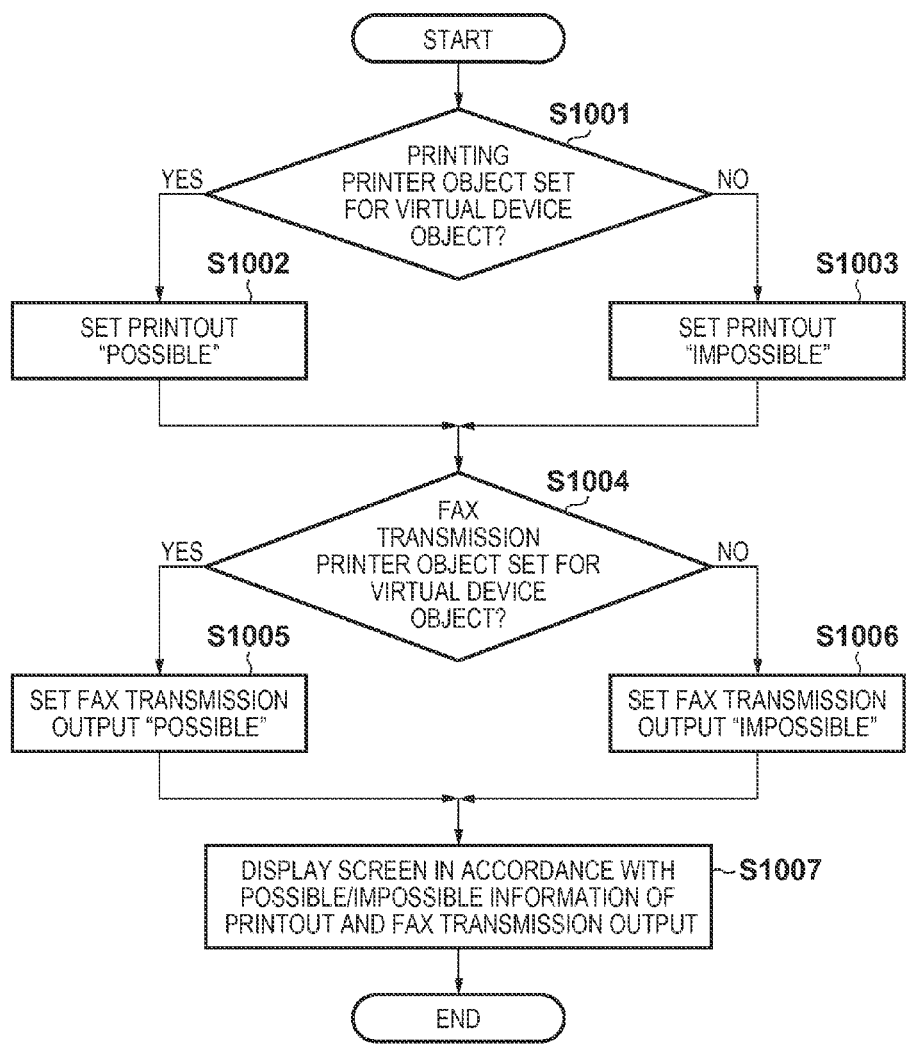

(54) INFORMATION PROCESSING APPARATUS, INFORMATION PROCESSING METHOD, AND COMPUTER-READABLE MEDIUM

BACKGROUND OF THE INVENTION

1. Field of the Invention

The present invention relates to an information processing apparatus which designates output from an image processing apparatus, an information processing method, and a computer-readable medium.

2. Description of the Related Art

When executing output from a PC (Personal Computer) to an image processing apparatus having a plurality of output functions, it is common practice to open a document to be output by an application, and designate output via a device driver corresponding to an output function. To further improve convenience of output to an image processing apparatus, there is a technique of integrating a plurality of device drivers into one virtual device.

For example, there is a technique of facilitating distributed printing to a plurality of devices by integrating device drivers corresponding to a plurality of different devices into one virtual device in accordance with an integration instruction from a user, and enabling output from the virtual device (see Japanese Patent Laid-Open No. 2006-215725).

Recent image processing apparatuses include various functions such as the FAX function and scan function. In general, there are various device drivers for respective purposes, and the user uses a device driver suited to his purpose. For example, the user uses a print driver for printing and a FAX transmission driver for FAX transmission. If various device drivers for a specific image processing apparatus are integrated into a virtual device driver, and various output instructions to the virtual device driver are accepted from the user, the functions of the image processing apparatus can be more easily used, improving convenience.

However, to implement this configuration, appropriate device drivers (device objects) need to be selected from a plurality of device drivers installed in an OS (Operating System). For example, when a print driver and FAX transmission driver are installed for use in output to a given image processing apparatus, the user needs to select two drivers corresponding to the image processing apparatus from a plurality of existing drivers. This may increase the operation burden on the user.

SUMMARY OF THE INVENTION

According to one aspect of the present invention, there is provided an information processing apparatus comprising: a display unit configured to display, on a display device, a virtual device object to which a first object of a first device driver corresponding to a first output function of an output apparatus and a second object of a second device driver corresponding to a second output function of the output apparatus are assigned; and an acceptance unit configured to accept a data output instruction to the displayed virtual device object, wherein when the data output instruction to the virtual device object is accepted, the display unit displays information capable of accepting an output instruction to one of the first output function and the second output function.

According to another aspect of the present invention, there is provided an information processing method comprising: displaying, on a display device, a virtual device object to which a first object of a first device driver corresponding to a first output function of an output apparatus and a second object of a second device driver corresponding to a second output function of the output apparatus are assigned; and accepting a data output instruction to the displayed virtual device object, wherein when the data output instruction to the virtual device object is accepted, information capable of accepting an output instruction to one of the first output function and the second output function is displayed in the displaying step.

According to another aspect of the present invention, there is provided a non-transitory computer-readable medium storing a program causing a computer to function as a display unit configured to display, on a display device, a virtual device object to which a first object of a first device driver corresponding to a first output function of an output apparatus and a second object of a second device driver corresponding to a second output function of the output apparatus are assigned, and an acceptance unit configured to accept a data output instruction to the displayed virtual device object, wherein when the data output instruction to the virtual device object is accepted, the display unit displays information capable of accepting an output instruction to one of the first output function and the second output function.

The present invention can more easily execute various output instructions to an image processing apparatus having a plurality of functions.

Further features of the present invention will become apparent from the following description of exemplary embodiments (with reference to the attached drawings).

BRIEF DESCRIPTION OF THE DRAWINGS

FIGS. 8A and 8B are flowcharts showing a virtual device object generation processing sequence;

FIG. 10 is a flowchart showing a virtual device object screen display control sequence.

DESCRIPTION OF THE EMBODIMENTS

An embodiment of the present invention will now be described with reference to the accompanying drawings.

[System Configuration]

Figure 1:
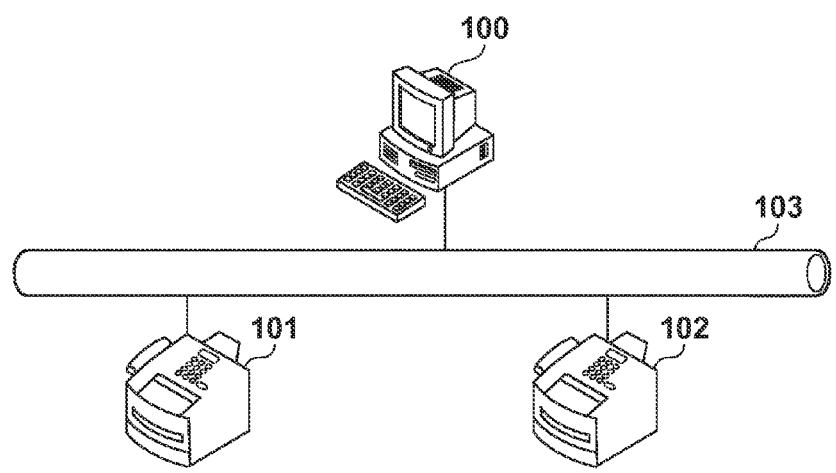
FIG. 1 is a view exemplifying the configuration of a system.

FIG. 1 is a view exemplifying the configuration of a data processing system in an embodiment of the present invention.

This example is a system in which an information processing apparatus 100, and image processing apparatuses 101 and 102 can communicate with each other via a network 103. Referring to FIG. 1, the information processing apparatus 100 is a computer used by the user who instructs the image processing apparatuses 101 and 102 on printing and FAX transmission. Each of the image processing apparatuses 101 and 102 corresponds to a multi-function peripheral (MFP) having the printer function, FAX function, copy function, scanner function, and file transmission function.

Note that a predetermined OS (Operating System: not shown) is installed in the information processing apparatus 100, and various applications (not shown) for executing specific function processes are also installed. The specific function processes include document processing, spreadsheet processing, presentation processing, image processing, and graphic processing. Each application has a unique data structure (file structure). The OS can issue a print instruction to a corresponding application by referring to the identifier of each file.

In the information processing apparatus 100, a virtual device application for using the image processing apparatuses 101 and 102 can be installed. The virtual device application has a function of issuing an output instruction such as printing or FAX transmission to an image processing apparatus, and a function of displaying the use state of an image processing apparatus and the execution status of an output job. The network 103 is a LAN (Local Area Network) to which various apparatuses are connected. Various apparatuses communicate information with each other via the network 103. The arrangement of the virtual device application will be described later with reference to FIG. 4.

[Hardware Arrangement (Information Processing Apparatus)]

Figure 2:
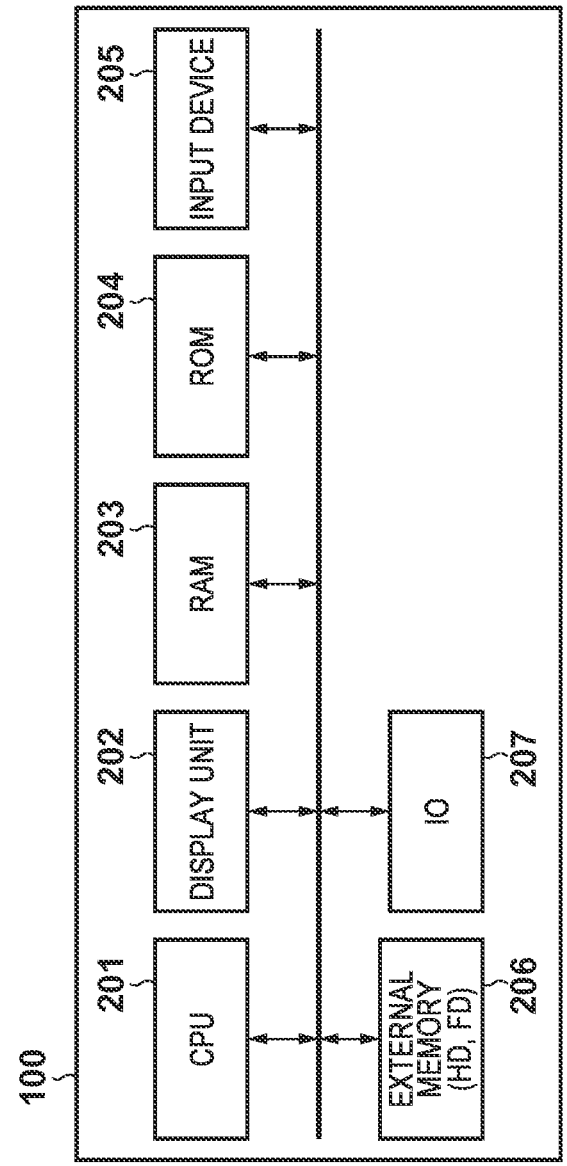
FIG. 2 is a block diagram exemplifying the hardware arrangement of an information processing apparatus.

FIG. 2 is a block diagram exemplifying the hardware arrangement of the information processing apparatus 100 shown in FIG. 1. Referring to FIG. 2, the information processing apparatus 100 includes an input device 205 which receives a user operation input from a keyboard, pointing device, or the like. The information processing apparatus 100 also includes a display unit 202 which gives a visual output information feedback to the user. Further, the information processing apparatus 100 includes a RAM 203 serving as a storage device which saves various programs and execution information, an external memory 206 such as an HDD (Hard Disk Drive) or FDD (Flexible Disk Drive), and a ROM 204.

The information processing apparatus 100 includes an interface device I/O 207 which communicates with an external device, and a CPU 201 which executes a program. The connection form between the information processing apparatus 100 and a peripheral device is arbitrarily wired or wireless. The information processing apparatus 100 is connected to the image processing apparatuses 101 and 102 via the external device connection I/F. For example, the information processing apparatus 100 may be a portable terminal. In this case, the information processing apparatus 100 may communicate with the image processing apparatus 101 by wireless communication.

[Hardware Arrangement (Image Processing Apparatus)]

Figure 3:
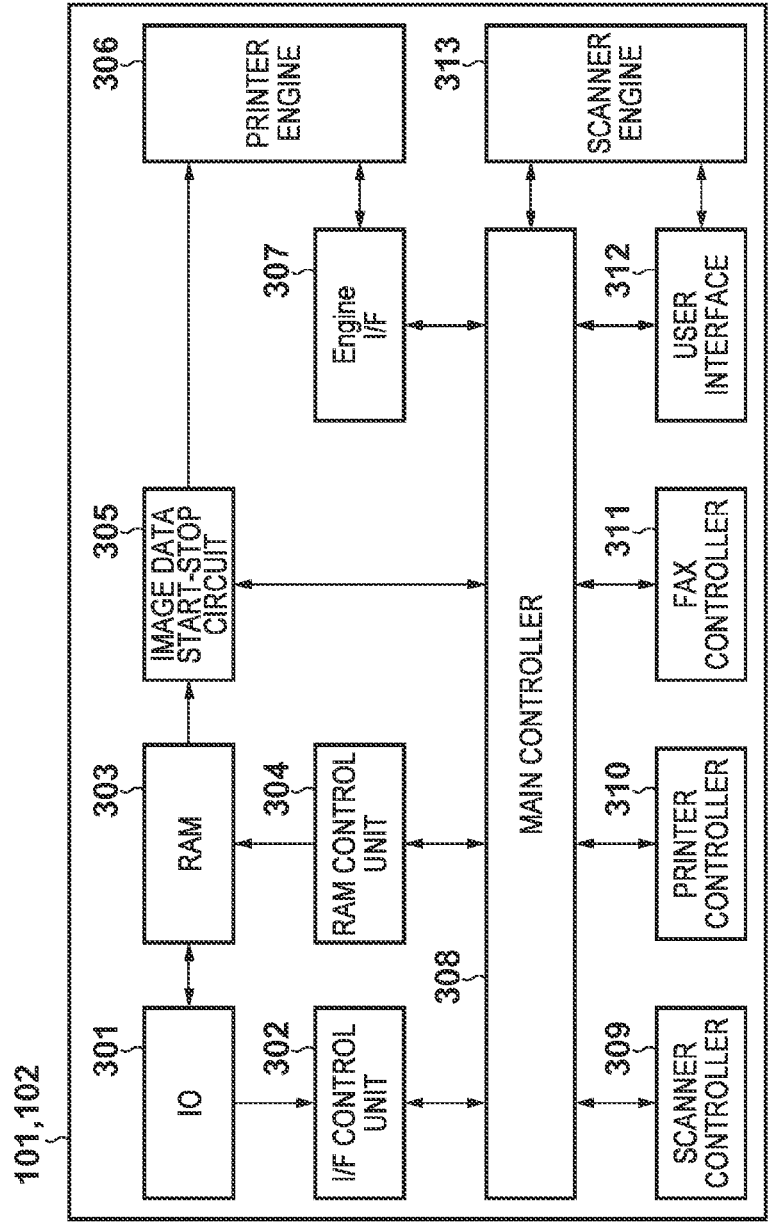
FIG. 3 is a block diagram exemplifying the hardware arrangement of an image processing apparatus.

FIG. 3 is a block diagram for explaining an example of a hardware arrangement in the image processing apparatuses 101 and 102 having a plurality of output functions shown in FIG. 1. This example shows an MFP having the scanner function, print function, and FAX transmission function as output functions. Although the image processing apparatus 101 will be exemplified, the image processing apparatus 102 also has the same arrangement in the embodiment.

Referring to FIG. 3, an I/O 301 connects the image processing apparatus 101 to the information processing apparatus 100 via a communication medium such as the network 103. A plurality of I/Os 301 may be mounted to cope with a plurality of connection forms. The image processing apparatus 101 transfers a device ID for identifying a device, and scanned image to the information processing apparatus 100 via the I/O 301. The image processing apparatus 101 receives various control commands from the information processing apparatus 100, and processes them.

An I/F control unit 302 pertains to the processing system of a scanner, printer, or FAX device mounted in the image processing apparatus 101, and controls to issue device IDs for identifying them. A RAM 303 is a primary storage and is used to store external data such as a control command accepted via the I/O 301 and an image read by a scanner engine 313. The RAM 303 is used to, for example, store an image rasterized by a printer controller 310 before transfer to a printer engine 306.

A RAM control unit 304 performs assignment and management of the RAM 303. An image data start-stop circuit 305 is a device which outputs, in synchronism with rotation of the printer engine 306, an image which is received by the printer controller 310 or scanner engine 313 and rasterized by the RAM control unit 304. The printer engine 306 is a device which develops an image on an output medium such as paper.

A main controller 308 is a module which performs various control operations of the printer engine 306 via an engine I/F 307, and serves as the core of control in the image processing apparatus 101. For example, the main controller 308 appropriately distributes a control language received from the information processing apparatus 100 via the I/O 301 to a scanner controller 309, the printer controller 310, and a FAX controller 311. Further, the main controller 308 controls the printer engine 306 and scanner engine 313 upon receiving instructions from the respective controllers and a user interface 312. By unifying control interfaces between the main controller 308 and various controllers, an expansion board capable of processing a plurality of types of control commands can be mounted on one peripheral device. The main controller 308 acquires the device ID of a currently mounted expansion controller from each controller, and manages it.

The scanner controller 309 decomposes a scan control command received from the information processing apparatus 100 into execution commands interpretable by the main controller 308. The scanner controller 309 changes an image read by the scanner engine 313 into a scan control command. The printer controller 310 decomposes a page description language received from the information processing apparatus 100 into an execution command including a rasterized image of the page description language that is interpretable by the main controller 308. The rasterized image is sent to the printer engine 306, and printed on an output medium such as paper.

The FAX controller 311 rasterizes a FAX control language received from the information processing apparatus 100 into an image, and transfers the image to another FAX apparatus or IP-FAX via a public line or the Internet (neither is shown). The user interface 312 is used as an instruction input/output means by the user when making various settings of the main controller 308 or directly executing the scanner function, printer function, and FAX function by the image processing apparatus 101. The scanner engine 313 reads a printed image using an optical device (not shown) in accordance with an instruction from the main controller 308, converts the read image into an electrical signal, and transfers the electrical signal to the main controller 308.

[Software Arrangement]

Figure 4:
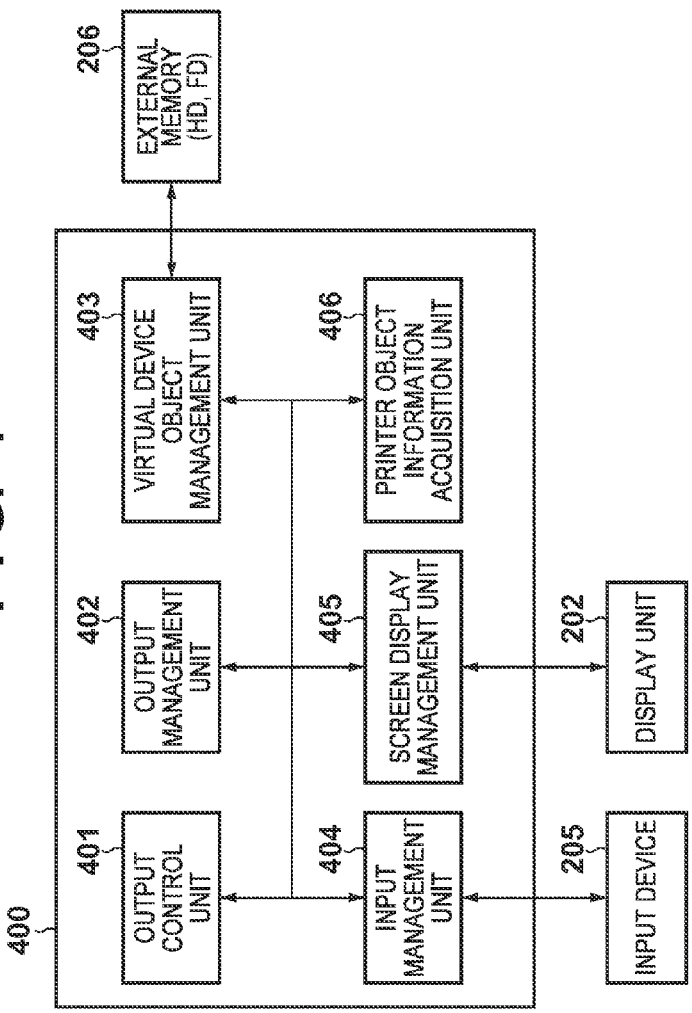
FIG. 4 is a block diagram exemplifying the software arrangement of a virtual device application.

FIG. 4 is a block diagram exemplifying the functional arrangement of a virtual device application 400 in the information processing apparatus 100. The virtual device application 400 is an application for displaying at once a plurality of device objects managed by the OS as a virtual device object, and controlling output.

To unify terms, a driver which can be installed in the OS for each function of the image processing apparatus will be described as a "device driver". For example, a printer driver for printing and a FAX driver for faxing will be described as device drivers. In this specification, a "printer object" is an object corresponding to a device driver for performing output processing in correspondence with each function of the image processing apparatus. When the image processing apparatus has a plurality of functions, the OS manages the printer objects of device drivers corresponding to the respective functions. Even for the same device driver, different settings can be made. In this case, a plurality of printer objects with different settings are associated with the same device driver. As printer object information, a set of set values for a device driver is defined. A practical example of the printer object will be described later with reference to FIG. 5. In this specification, a printer object is sometimes called an object simply.

In this specification, a "virtual device object" is a virtual integration of the printer objects of a printer (multi-function peripheral) having a plurality of functions, and is displayed as one object. An example of the virtual device object will be described later with reference to FIG. 5.

The virtual device application 400 includes an input management unit 404, screen display management unit 405, printer object information acquisition unit 406, virtual device object management unit 403, output control unit 401, and output management unit 402. The input management unit 404 detects an operation to the input device 205 by the user via the GUI (Graphical User Interface) of the virtual device application 400 that is displayed by the screen display management unit 405, and acquires operation information. The screen display management unit 405 controls screen display such as display of a virtual device object and display of an output selection as in FIGS. 7A to 7D each exemplifying the GUI of the virtual device application 400.

The printer object information acquisition unit 406 acquires information of a printer object managed by the OS and information of a device driver assigned to a printer object. The printer object information acquisition unit 406 determines whether a device driver assigned to a printer object can cooperate with the virtual device application 400. More specifically, an IF (InterFace: not shown) for controlling a device driver function from the virtual device application 400 is sometimes laid open. The IF is laid open as the SDK (Software Development Kit) of a device driver, and guarantees a cooperative operation with the virtual device application 400. This cooperation indicates, for example, exchanging data and commands to provide the functions of the device driver and virtual device application 400 to each other and execute processing. The virtual device application 400 can perform control with the device driver via the IF. By checking whether a device driver includes the IF, the printer object information acquisition unit 406 determines whether cooperation with the device driver is possible.

Figure 6:
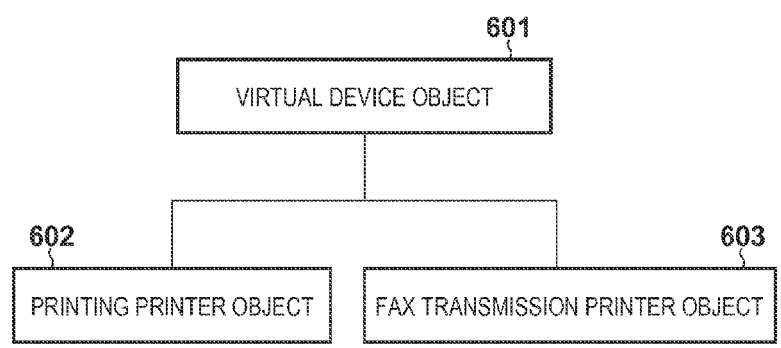
FIG. 6 is a block diagram exemplifying the arrangement of a virtual device object.

The virtual device object management unit 403 generates and manages configuration information of a virtual device object, as shown in FIG. 6. More specifically, the virtual device object management unit 403 builds the configuration of a virtual device object based on printer object information acquired from the printer object information acquisition unit 406. The virtual device object management unit 403 controls to, for example, write the configuration of a virtual device object and setting information such as the function settings of the virtual device object in a setting file saved in the external memory 206, and read setting information from the setting file.

The output control unit 401 issues an output instruction to the image processing apparatus 101. More specifically, upon accepting an output instruction from the user via the input management unit 404, the output control unit 401 issues an output instruction to a device driver assigned to a corresponding printer object based on the output instruction. For example, when an output instruction from the user is a print instruction, the output control unit 401 issues an output instruction to a printing device driver. When an output instruction from the user is a FAX transmission instruction, the output control unit 401 issues an output instruction to a FAX transmission device driver.

Upon accepting the instruction, the device driver converts a document file designated by the output instruction into output instruction information interpretable by the image processing apparatus 101. "Output instruction information" to be converted is a data format for printing (for example, PDL (Page Description Language)) for printout. For FAX transmission, output instruction information to be converted is a data format for FAX transmission (for example, raster data). The device driver transmits the converted output instruction information to the corresponding image processing apparatus 101 via the network 103.

The output management unit 402 communicates with the image processing apparatus 101, and acquires status information of the image processing apparatus 101 and status information of an execution job. When an output port (not shown) set for a printer object is the application compatible port of the virtual device application 400, the output management unit 402 acquires various types of information via this output port. The information to be acquired includes status information (for example, printable or error) of the image processing apparatus 101, and status information (for example, during processing or completion) of an execution job (printing or FAX transmission). Note that the application compatible port is an output port which is uniquely defined in advance to use it for a specific application. The output management unit 402 transfers the acquired status information to the screen display management unit 405. The screen display management unit 405 displays the status information on the GUI of a virtual device object (not shown). Note that information to be displayed on the GUI of a virtual device object may be configured to allow the user to set information to be displayed. Also, status information of the execution job may display the name of a file to be output.

Note that the virtual device application 400 is sometimes called a widget or gadget.

[Printer Object Management Screen and Virtual Device Application Display Screen]

Figure 5:
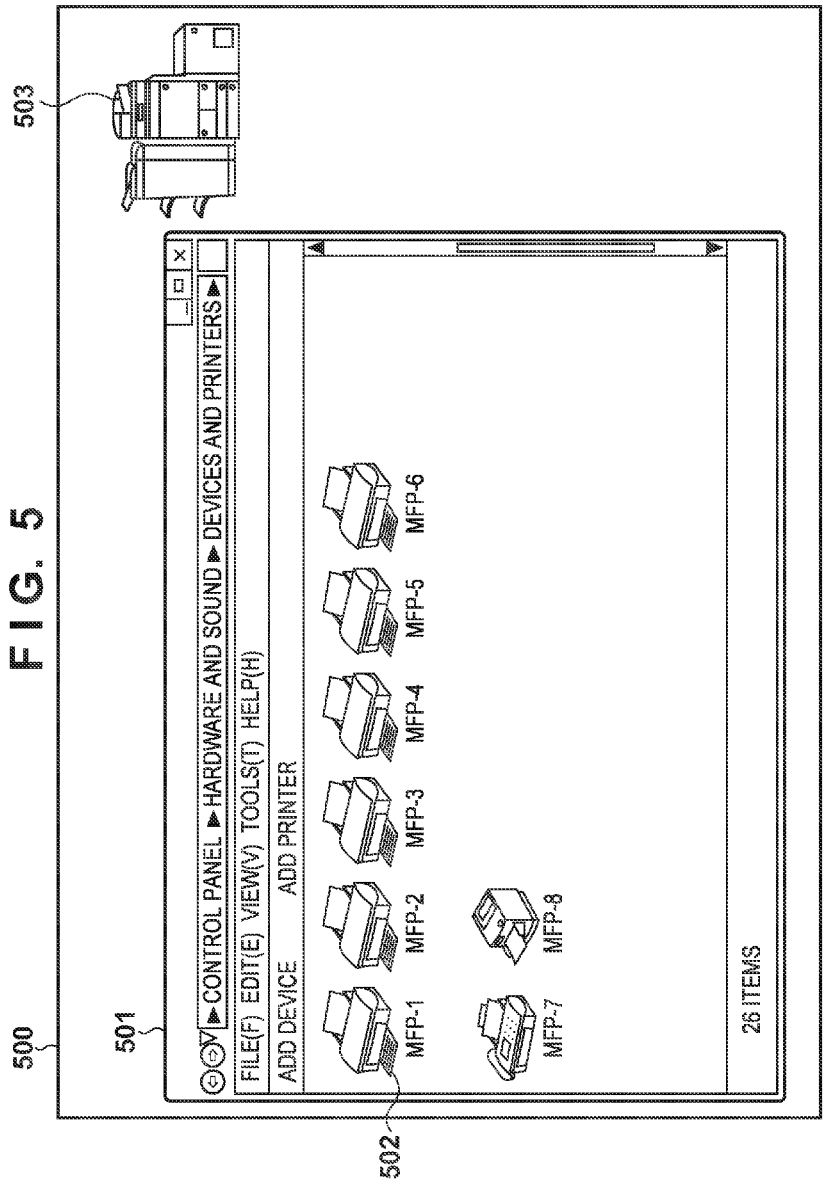
FIG. 5 is a view exemplifying a printer object management screen and virtual device application UI display.

FIG. 5 is a view schematically showing the printer object management screen and virtual device application display screen of the OS. A desktop screen 500 is displayed by the OS, and visually represents a printer object management screen 501 of the OS and printer objects 502 managed by the OS. The printer object management screen 501 displays a list of printer objects 502 corresponding to all device drivers installed in the OS. When a device driver is installed in the OS, the OS displays a printer object 502 corresponding to the device driver on the management screen 501.

In the management screen 501, printer objects suited to respective purposes exist as the printer objects 502. More specifically, there are a printing printer object for transmitting print instruction data to the image processing apparatus, and a FAX transmission printer object for transmitting FAX transmission instruction data to the image processing apparatus. When physically one image processing apparatus has a plurality of available functions, different printer objects 502 are displayed for the respective functions (device drivers). When a plurality of settings are made for one device driver, they are displayed as respective printer objects 502.

A virtual device object 503 schematically represents the display state of a virtual device object in the virtual device application 400. The virtual device object 503 is displayed on the desktop of the OS. The virtual device object 503 accepts an output instruction to data (file) to be output from the user, and can easily implement an output the user wants.

FIG. 6 is a block diagram conceptually showing the arrangement of the virtual device object 503 according to the embodiment. A printing printer object 602 and FAX transmission printer object 603 corresponding to a specific image processing apparatus are assigned to a virtual device object 601. As for the virtual device object 601 according to the embodiment, two different functions executable by physically one image processing apparatus are assigned to one virtual device object.

When the virtual device object 503 accepts a print instruction from the user, output is executed via the printer object 502 assigned as a printing printer object. When the virtual device object 503 accepts a FAX transmission instruction, output is executed via the printer object 502 assigned as a FAX transmission printer object. When a plurality of image processing apparatuses exist as in the system configuration of the embodiment, one virtual device object 503 can be generated for each image processing apparatus.

[Display UI when Executing Output by Virtual Device Application]

Figure 7A:
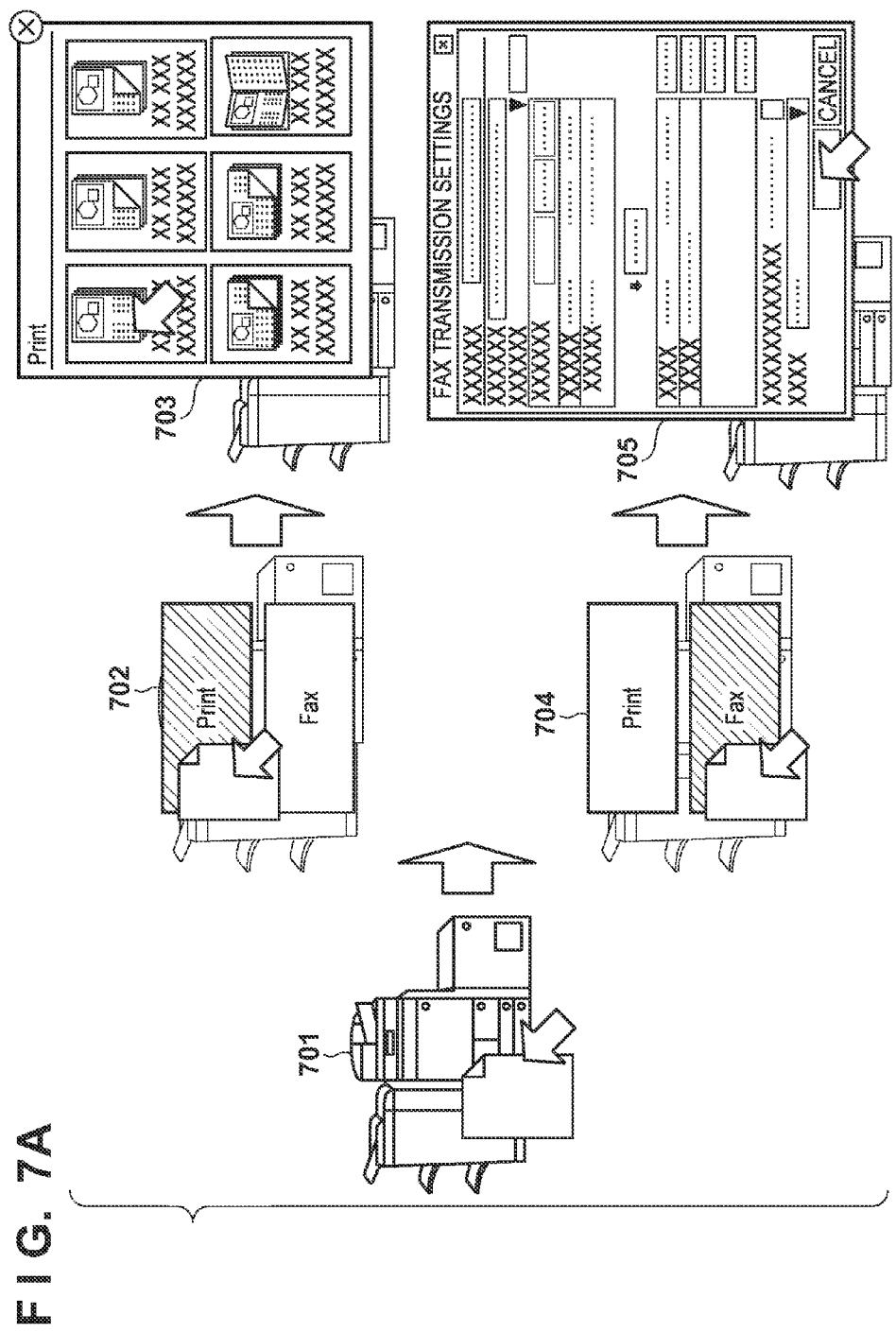
FIG. 7A is a view exemplifying a UI display upon an output operation to a virtual device object.
Figure 11:
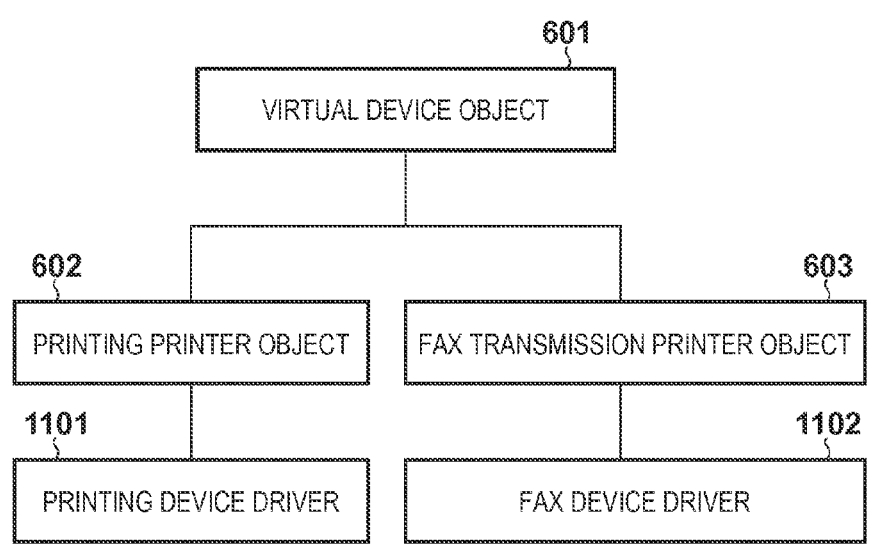
FIG. 11 is a block diagram showing the relationship between a device object and a device driver.

FIG. 7A is a view schematically showing a UI (User Interface) when executing output by the virtual device application 400. Assume that the virtual device application 400 accepts an operation of dragging a file to be output onto a virtual device object by the user, as represented by 701. In this case, the virtual device application 400 displays icons corresponding to output functions on the display of the virtual device object, as represented by 702 and 704. In this case, an icon "Print" corresponding to the printing printer object and an icon "Fax" corresponding to the FAX transmission printer object are displayed as selectable functions. By dropping a file to an icon corresponding to an output the user wants to execute, he can achieve this output. This drag operation corresponds to acceptance of a data output instruction to the virtual device object. In addition, an output instruction may be accepted by right-clicking a file to be output and selecting a print menu from the virtual device object. FIG. 11 shows the relationship between each printer object and each device driver.

When the virtual device application 400 accepts a drop operation to the icon "Print" (702), it displays a UI screen for designating print settings, as represented by a setting screen 703. When the user designates print settings, the virtual device application 400 executes a print instruction to a corresponding image processing apparatus. More specifically, a printing device driver 1101 corresponding to the printing printer object 602 of the virtual device object 601 is notified of the dropped file and the print settings selected on the setting screen 703. The printing device driver 1101 generates print data based on the dropped file and print settings, and transmits it to the image processing apparatus, thereby printing.

When the virtual device application 400 accepts a drop operation to the icon "Fax" (704), it displays a destination designation screen for FAX transmission, as represented by a setting screen 705. When the user designates a destination and performs an execution operation, the virtual device application 400 executes a FAX transmission instruction to a corresponding image processing apparatus. More specifically, a FAX device driver 1102 corresponding to the FAX transmission printer object 603 of the virtual device object 601 is notified of the dropped file and the selected destination information. The FAX device driver 1102 generates FAX data based on the dropped file and destination information, and transmits them to the image processing apparatus, thereby executing FAX processing.

Various setting UIs displayed on the setting screens 703 and 705 are not particularly limited, and a UI managed by the virtual device application 400 may be displayed or the UI of a corresponding printer object may be invoked.

Figure 7B:
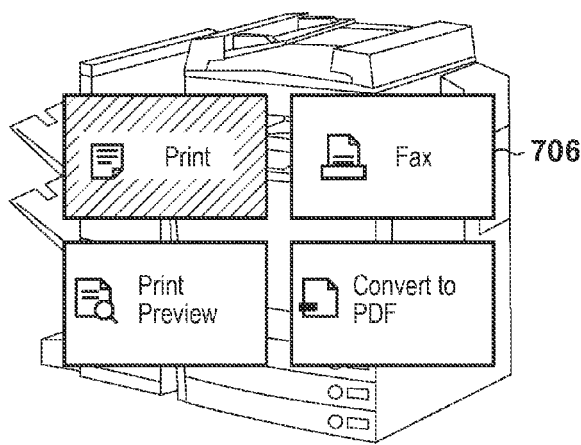
FIG. 7B is a view exemplifying the UI display of the virtual device object.

As other icons for output selection that can be selected by a drop operation in the virtual device application 400, icons pertaining to print preview and PDF conversion may be displayed and selected. FIG. 7B shows a display example 706 in this case.

Figure 7C:
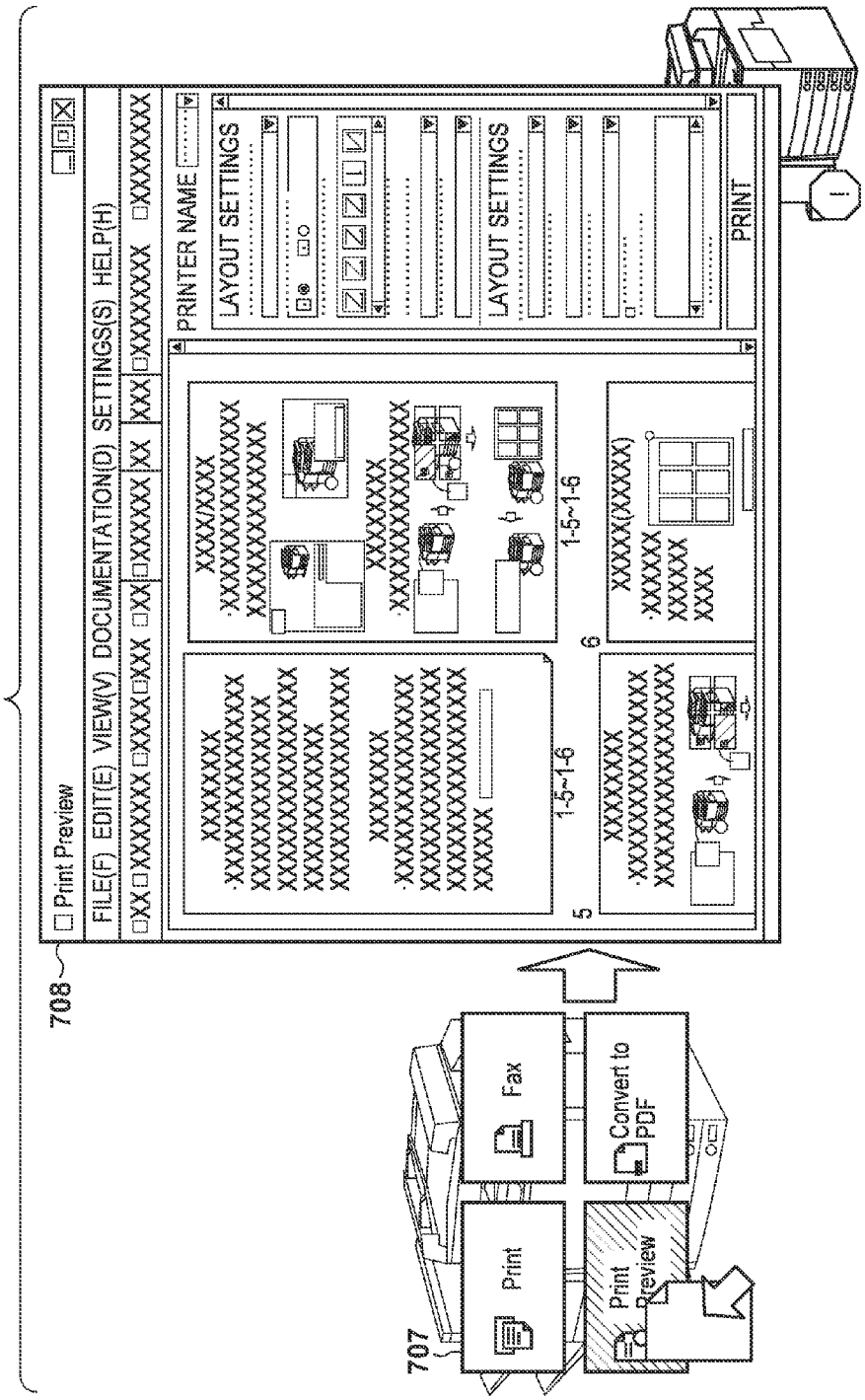
FIG. 7C is a view exemplifying a UI display upon an output operation to the virtual device object.
Figure 7D:
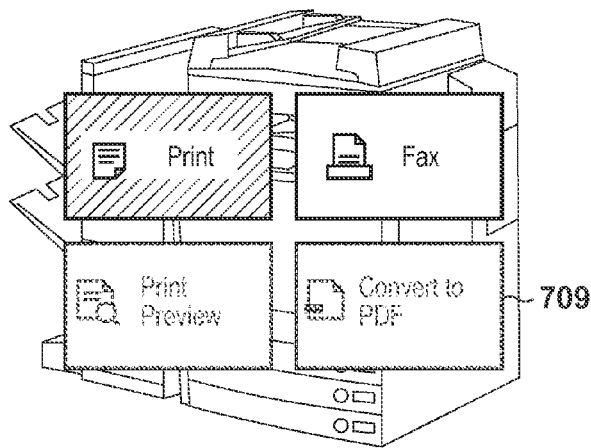
FIG. 7D is a view exemplifying the UI display of the virtual device object.

Assume that the virtual device application 400 accepts a drop operation to the print preview (icon "Print Preview"), as shown in FIG. 7C (707). In this case, the virtual device application 400 displays a UI screen 708 which displays the print preview of a document file. While checking the print preview, the user may be allowed to change print settings and execute printing. Printing is implemented by accepting a print instruction via the UI screen 708. Assume that the virtual device application 400 accepts a drop operation to PDF conversion (icon "Convert to PDF"). In this case, the virtual device application 400 designates processing of converting a document file into a file of the PDF format.

The virtual device application 400 may be configured to restrict the use of an application based on license authentication. For example, when the license is invalid because the period of validity of the virtual device application 400 has expired, usable functions are restricted, as represented by 709 in FIG. 7D. When the virtual device application 400 accepts an operation of dragging a file onto a virtual device object by the user, it confirms validity/invalidity of the license. If there is an invalid function, the virtual device application 400 controls to represent that the function is unusable. For example, in FIG. 7D, an icon representing a function is changed to be grayed out as a display which inhibits selection of a function to be invalidated. As another example, the virtual device application 400 may control to hide an icon.

[Virtual Device Object Generation Processing Sequence]

Figure 8B:
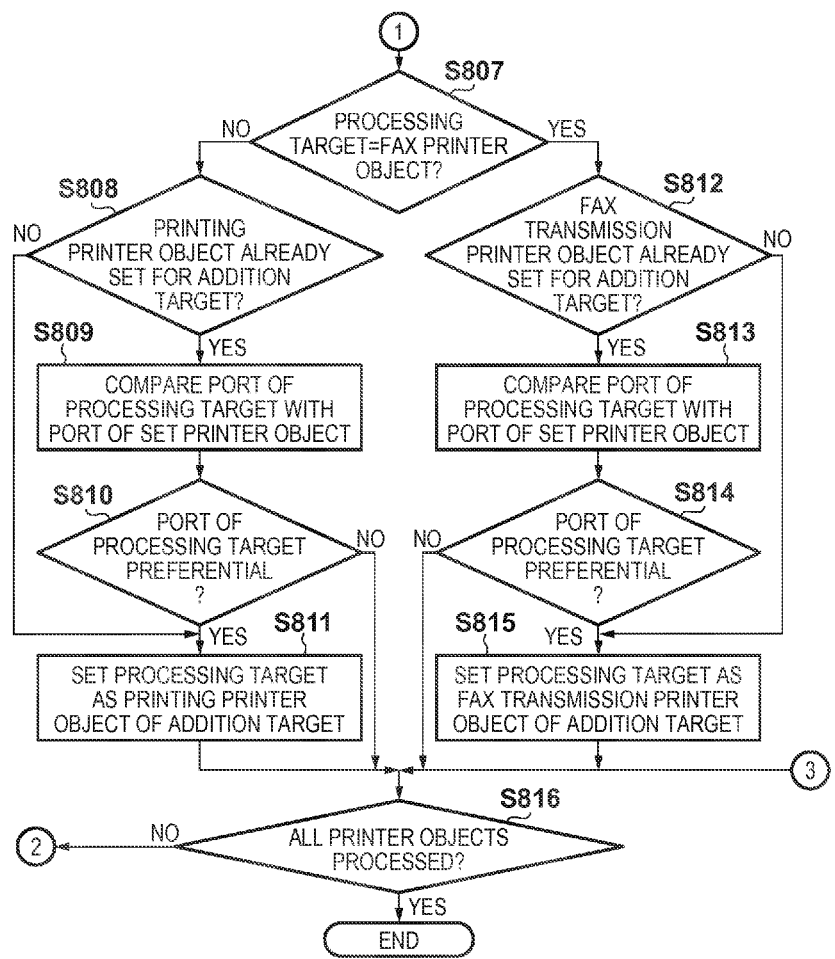

FIGS. 8A and 8B are flowcharts exemplifying a virtual device object generation processing sequence by the virtual device application 400 according to the embodiment. The present invention can easily implement various outputs to the image processing apparatus by using a virtual device object, and reduces the burden of setting for using the virtual device object. Hence, it is desirable to be able to use the virtual device object without any complicated setting procedure after installing the virtual device application 400 in the OS. In the processing example according to this sequence, a virtual device object is automatically generated using information of a printer object corresponding to a device driver installed in the OS upon the first activation of the virtual device application 400. Upon the first activation of the virtual device application 400, the virtual device application determines whether at least one device driver has been installed. If no device driver exists, processing shown in FIGS. 8A and 8B is not executed. If the virtual device application 400 receives a virtual device object addition instruction from the user and no device driver does not exist, the virtual device application 400 displays a message to prompt the user to install a device driver.

The respective steps of the flowchart in this specification are shown and implemented by loading the virtual device application 400, device driver, and the like stored in the ROM 204, external memory 206, or the like into the RAM 203, and executing them by the CPU 201. This processing is executed when the virtual device application 400 in the information processing apparatus 100 accepts an activation instruction. This processing may be executed when a new device driver is installed.

Upon accepting an activation instruction, first in step S801, the printer object information acquisition unit 406 requests acquisition of information of a printer object corresponding to a printer driver installed in the OS. From the response, the printer object information acquisition unit 406 acquires information of printer objects corresponding to all printer drivers installed in the OS. In step S802, the virtual device object management unit 403 sets, as a processing target, information of one printer object out of the acquired information of all printer objects. The virtual device object management unit 403 designates the printer object name of the printer object information serving as the processing target, and instructs the printer object information acquisition unit 406 to initialize the IF of a printer driver assigned to the processing target. At this time, the printer object information acquisition unit 406 tries initialization via a printer driver SDK (not shown). This "initialization" indicates processing of invoking the IF of the printer driver via the printer driver SDK (not shown) and trying to acquire configuration information of the printer driver.

In step S803, upon accepting the processing result of initialization processing by the device driver SDK (not shown), the printer object information acquisition unit 406 determines whether the initialization processing has succeeded or failed. The printer object information acquisition unit 406 transfers the result to the virtual device object management unit 403. If the initialization processing has succeeded, the IF has been invoked successfully, and configuration information can be acquired. If the IF cannot be invoked because, for example, an installed device driver does not cooperate with the virtual device application, the initialization processing fails. If the initialization has succeeded, the printer object information acquisition unit 406 determines that the printer driver can cooperate with the virtual device application 400 (YES in step S803). If the initialization has failed, the printer object information acquisition unit 406 determines that the printer driver cannot cooperate with the virtual device application 400 (NO in step S803).

If the printer object information acquisition unit 406 determines that the printer driver is incapable of cooperation (NO in step S803), subsequent determination processing is not executed, and the process advances to step S816. If the printer object information acquisition unit 406 determines that the printer driver is capable of cooperation (YES in step S803), the process advances to step S804. In step S804, the virtual device object management unit 403 refers to address information of the processing target printer object information, and determines whether a virtual device object including a printer object having the same address information has already been generated. This address information corresponds to, for example, the IP address of an image processing apparatus. By this determination, it is confirmed whether a virtual device object for physically the same image processing apparatus has been generated.

If a virtual device object for the same image processing apparatus has already existed (YES in step S804), the process advances to step S805. The virtual device object management unit 403 adds the processing target printer object as an addition target candidate to information of the virtual device object. If a virtual device object for the same image processing apparatus does not exist (NO in step S804), the process advances to step S806, and the virtual device object management unit 403 newly generates virtual device object information. The virtual device object management unit 403 adds the processing target printer object to the newly generated virtual device object information.

In step S807, the virtual device object management unit 403 instructs the printer object information acquisition unit 406 to determine whether a device driver assigned to the processing target printer object is a FAX transmission device driver. More specifically, the printer object information acquisition unit 406 executes this determination by referring to device driver information via the device driver SDK (not shown). If the printer object information acquisition unit 406 determines that the device driver is not a FAX transmission device driver but a printing device driver (NO in step S807), the process advances to step S808. If the printer object information acquisition unit 406 determines that the device driver is a FAX transmission device driver (YES in step S807), the process advances to step S812.

In step S808, the virtual device object management unit 403 determines whether a printing printer object has already been assigned to the virtual device object. If no printing printer object has been assigned (NO in step S808), the process advances to step S811. In step S811, the virtual device object management unit 403 assigns the processing target printer object as the printing printer object of the virtual device object to be added.

If a printing printer object has already been assigned (YES in step S808), the process advances to step S809. In step S809, the virtual device object management unit 403 refers to output port information of the already-assigned printer object information, and compares it with output port information of the processing target printer object. More specifically, the virtual device object management unit 403 instructs the output management unit 402 to determine whether the output port is an application compatible port.

The OS manages output port information for each type (not shown). For example, for a Standard TCP/IP port serving as a general output port, ports of the same type (Standard TCP/IP) are grouped and managed by the OS. Also, application compatible ports are designated in advance in the same way, and grouped and managed by the OS. By referring to the management information of the OS, this determination can be made based on whether the output port of the processing target printer object is included in a group of application compatible ports. The output management unit 402 determines each output port as an application compatible port when it is included in the application compatible port group, and as an application incompatible port when it is not included.

In step S810, the virtual device object management unit 403 determines whether the output port of the processing target printer object is used preferentially to the output port of the printer object already assigned to the virtual device object. When the output port of the assigned printer object is an application incompatible port and the output port of the processing target is an application compatible port, it is determined that the output port of the processing target is preferential. In other cases, it is determined that the output port of the processing target is not preferential. This indicates that a printer object having a predetermined output port setting is used out of a plurality of printer objects for the same device driver. Note that an application compatible port is a port capable of acquiring the statuses of the image processing apparatuses 101 and 102 and the processing statuses of print data in the image processing apparatuses 101 and 102. By giving priority to a printer object having the application compatible port, the virtual device application can display the status of a printer and the processing status of print data for the virtual device object. For the Standard TCP/IP port, the processing status of print data cannot be acquired, so priority is given to a printer object having the application compatible port. By this processing, for example, when an output port preferable in use of the virtual device application is determined, the virtual device application can be used more effectively. The user need not make a selection, improving user friendliness.

If the virtual device object management unit 403 determines that the output port of the processing target printer object is not preferential (NO in step S810), it does not assign the processing target printer object as the printing printer object of the virtual device object to be added. The process then advances to step S816. If the virtual device object management unit 403 determines that the output port of the processing target printer object is preferential (YES in step S810), it assigns the processing target printer object as the printing printer object of the virtual device object to be added (S811). After that, the process advances to step S816. By the processes in steps S809 to S811, when there are a plurality of candidates to be assigned as a printing printer object, they are prioritized by their output ports, and a printer object more suitable for an application function can be selected.

If the processing target printer object is a FAX transmission printer object (YES in step S807), the process advances to step S812. In step S812, the virtual device object management unit 403 determines whether a FAX transmission printer object has already been assigned to the virtual device object. If no FAX transmission printer object has been assigned (NO in step S812), the process advances to step S815, and the virtual device object management unit 403 assigns the processing target printer object as the FAX transmission printer object of the virtual device object to be added.

If a FAX transmission printer object has already been assigned to the virtual device object (YES in step S812), the process advances to step S813. In step S813, similar to step S809, the virtual device object management unit 403 refers to output port information of the printer object already assigned to the virtual device object, and compares it with output port information of the processing target printer object. In step S814, similar to step S810, the virtual device object management unit 403 determines whether the output port of the processing target printer object is used preferentially to the output port of the assigned printer object. If the virtual device object management unit 403 determines that the output port of the processing target printer object is not preferential (NO in step S814), it does not assign the processing target printer object as the FAX transmission printer object of the virtual device object to be added, and the process then advances to step S816. If the virtual device object management unit 403 determines that the output port of the processing target printer object is preferential (YES in step S814), it assigns the processing target printer object as the FAX transmission printer object of the virtual device object to be added (S815). The process then advances to step S816. By the processes in steps S813 to S815, when there are a plurality of candidates to be assigned as a FAX transmission printer object, they are prioritized by their output ports, and a printer object more suitable for an application function can be selected.

In step S816, the virtual device object management unit 403 determines whether all pieces of printer object information acquired in step S801 have been processed as the processing target. If all pieces of printer object information have been processed (YES in step S816), the processing of this sequence is completed, and the process ends. If all pieces of printer object information have not been processed (NO in step S816), the process advances to step S802, and the virtual device object management unit 403 newly sets unprocessed printer object information as the processing target, and repeats the process.

This processing is premised on automatic generation of a virtual device object, the use of which is recommended by the user, upon the first activation of the virtual device application. In the embodiment, therefore, a printer object capable of cooperating with the application is selected, and the selected printer object capable of cooperation is set as a target to be assigned to a virtual device object. By selecting a printer object capable of cooperation, a close cooperative operation with the virtual device application becomes possible.

Note that a printer object assigned to a virtual device object is not always limited to one capable of cooperation. For example, a printer object selection means (not shown) by the user may be arranged instead of automatic generation, and the configuration of a virtual device object may be built by a selection operation using the printer object selection means.

By the above-described processing, printing and FAX transmission printer objects suited for use in the virtual device application are selected from printer objects corresponding to device drivers installed in the OS. The selected printer objects are integrated to generate a virtual device object. The user can use the virtual device object function in the virtual device application 400 without any complicated setting procedure. When a plurality of printer objects are managed on the management screen 501 of FIG. 5 for a plurality of devices, a plurality of virtual device objects are generated by executing the processing shown in FIGS. 8A and 8B. The virtual device application selects an appropriate virtual device object from the virtual device objects and displays it. This selection processing will be explained with reference to FIGS. 9A and 9B.

[Recommended (Default) Virtual Device Object Selection Processing Sequence]

Figure 9A:
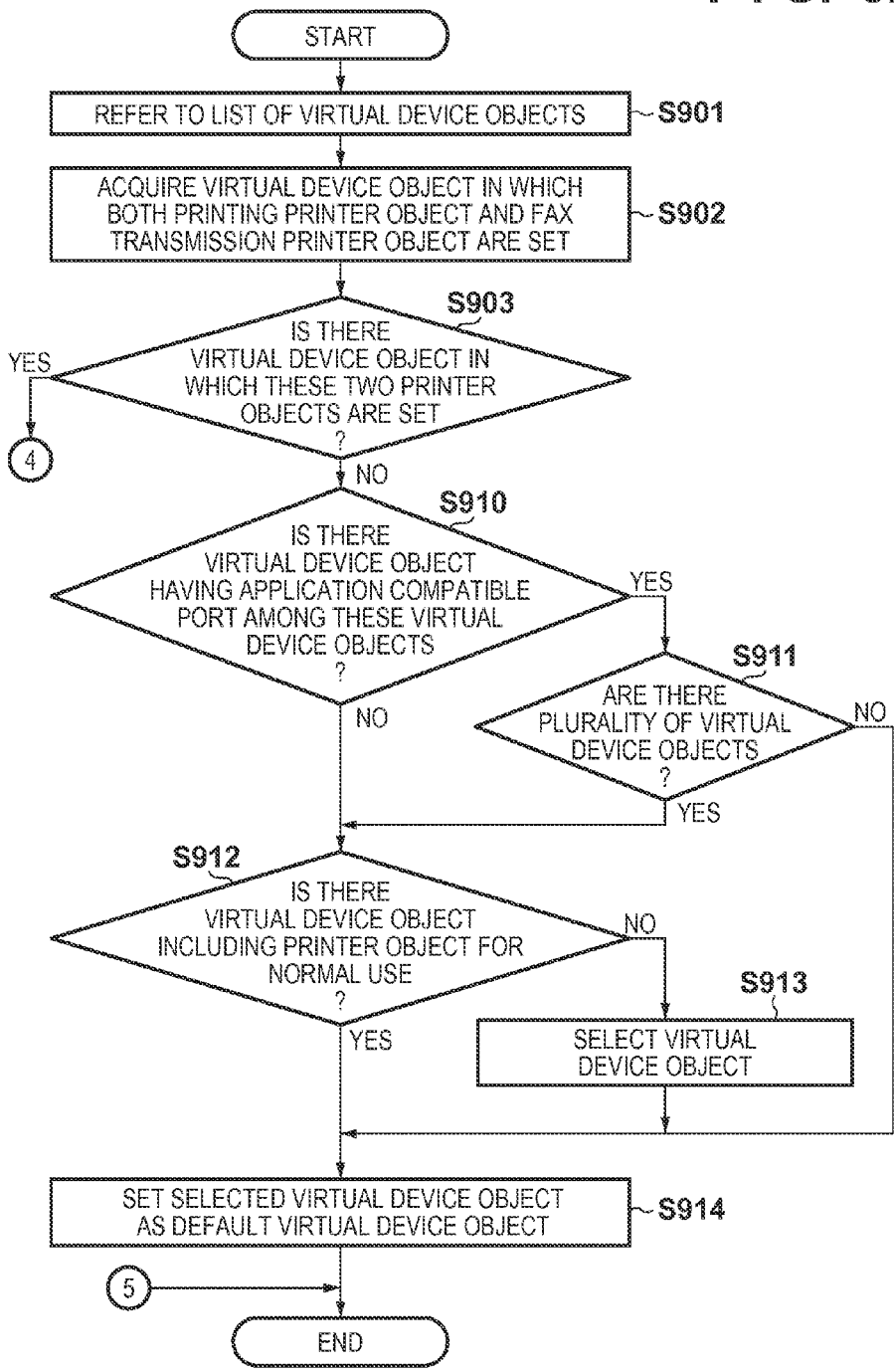
FIGS. 9A and 9B are flowcharts showing a virtual device object selection processing sequence.
Figure 9B:
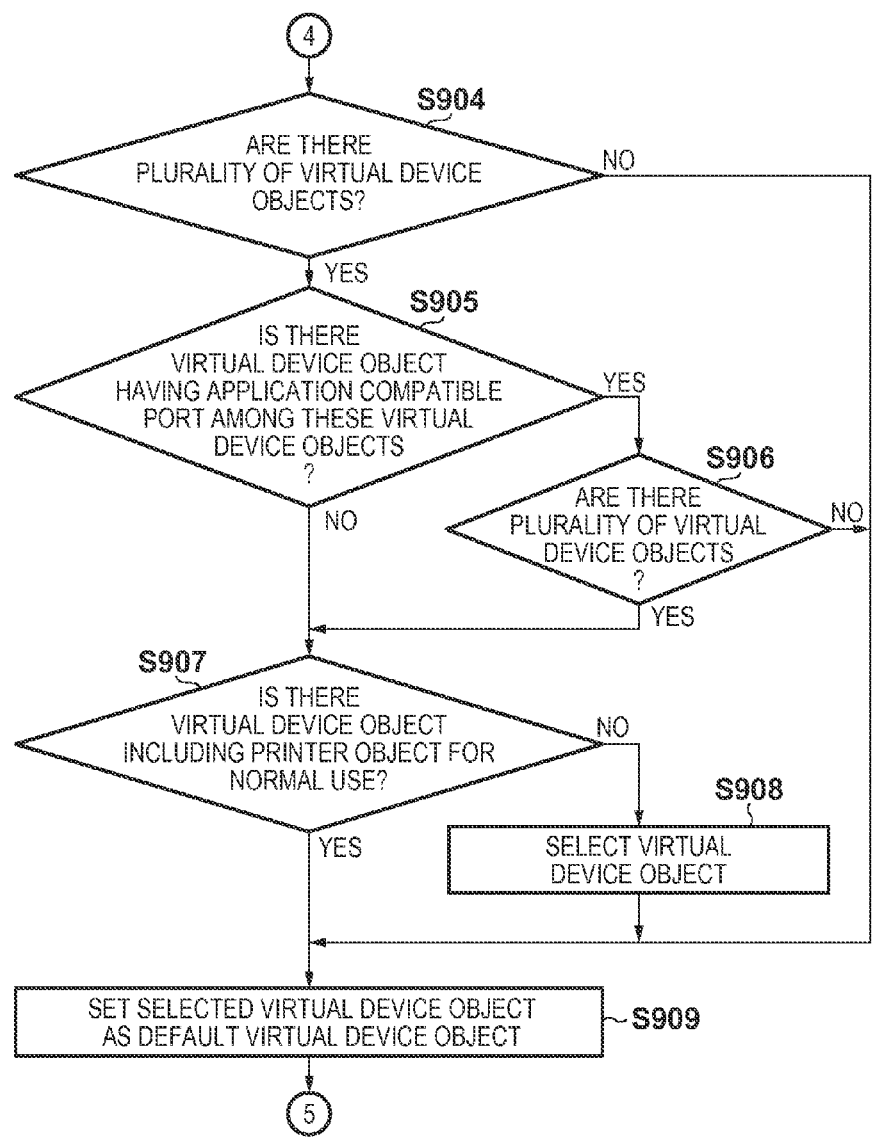

FIGS. 9A and 9B are flowcharts exemplifying a selection processing sequence for a virtual device object, the use of which is recommended to the user. This processing is processing of selecting one virtual device object, the use of which is recommended to the user, from a plurality of virtual device objects generated according to the sequence of FIGS. 8A and 8B. In the embodiment, after installing the virtual device application 400 in the OS, one recommended virtual device object is selected and displayed automatically. Together with the processing in FIGS. 8A and 8B, the user can quickly use a function provided by the virtual device application 400 without any cumbersome operation.

Processing represented by this sequence is executed upon completion of the processing in FIGS. 8A and 8B after the first activation of the virtual device application 400. This processing sets one recommended virtual device object from generated virtual device objects. The virtual device object management unit 403 executes this processing based on information managed by the virtual device object management unit 403.

In step S901, the virtual device object management unit 403 refers to information of all virtual device objects generated by the processing of FIGS. 8A and 8B. In step S902, the virtual device object management unit 403 searches the virtual device object information referred to in step S901 for a virtual device object to which both printing and FAX transmission printer objects are assigned. In step S903, the virtual device object management unit 403 determines whether there is a virtual device object to which both printing and FAX transmission printer objects are assigned. If there is a virtual device object to which these two printer objects are assigned (YES in step S903), the process advances to step S904. If there is no such virtual device object (NO in step S903), the process advances to step S910.

In step S904, the virtual device object management unit 403 determines whether there are a plurality of virtual device objects to each of which both printing and FAX transmission printer objects are assigned. If a plurality of virtual device objects to each of which these two printer objects are assigned do not exist (NO in step S904), the process advances to step S909. In step S909, the virtual device object management unit 403 sets the acquired virtual device object as a recommended (default) virtual device object, and ends the process. If there are a plurality of virtual device objects to each of which both printing and FAX transmission printer objects are assigned (YES in step S904), the process advances to step S905. In step S905, the virtual device object management unit 403 refers to information of printer objects assigned to the respective virtual device objects, and determines whether there is a printer object in which an application compatible port is assigned among set output ports.

If there is a virtual device object including a printer object in which an application compatible port is assigned to an output port (YES in step S905), the process advances to step S906. In step S906, the virtual device object management unit 403 determines whether there are a plurality of virtual device objects each including a printer object having an application compatible port. If a plurality of such virtual device objects do not exist (NO in step S906), the process advances to step S909, and the virtual device object management unit 403 sets the virtual device object as a recommended virtual device object, and ends the process. If a virtual device object including a printer object in which an application compatible port is assigned to an output port does not exist (NO in step S905), the process advances to step S907.

If there are a plurality of virtual device objects each including a printer object in which an application compatible port is assigned to an output port (YES in step S906), the process advances to step S907. In step S907, the virtual device object management unit 403 refers to information of printer objects assigned to the respective virtual device objects, and determines whether there is a virtual device object including a printer object for normal use. The printer object for normal use is information managed by the OS (not shown), and a printer object designated as a default in output processing. In general, this printer object corresponds to a printer object which is frequently used by the user, that is, a printer object having an attribute representing normal use.

If there is a virtual device object including a printer object for normal use (YES in step S907), the process advances to step S909. In step S909, the virtual device object management unit 403 sets a virtual device object including the printer object for normal use as a recommended virtual device object, and ends the process.

If a virtual device object including a printer object for normal use does not exist (NO in step S907), the process advances to step S908. In step S908, the virtual device object management unit 403 selects one virtual device object from a plurality of virtual device objects. In this case, a recommended virtual device object has not been discriminated in previous processing, and selection of a virtual device object at this time is not particularly limited. For example, a virtual device object including the first printer object in sort order of printing printer objects may be selected. Also, priority may be determined using another condition. It is also possible to display virtual device objects remaining after the processing of step S907 and select one of them by the user. Then, the process advances to step S909, and the virtual device object management unit 403 sets a virtual device object selected in step S908 as a recommended virtual device object.

A case in which a virtual device object to which both printing and FAX transmission printer objects are assigned does not exist in step S903 (NO in step S903) will be explained. In this case, in step S910, the virtual device object management unit 403 refers to information of printer objects assigned to respective virtual device objects, and determines whether an application compatible port is assigned to an output port.

If there is a virtual device object including a printer object in which an application compatible port is assigned to an output port (YES in step S910), the process advances to step S911. In step S911, the virtual device object management unit 403 determines whether there are a plurality of virtual device objects each including a printer object having an application compatible port. If a plurality of such virtual device objects do not exist (NO in step S911), the process advances to step S914, and the virtual device object management unit 403 sets the virtual device object as a recommended virtual device object, and ends the process. If a virtual device object including a printer object in which an application compatible port is assigned to an output port does not exist (NO in step S910), the process advances to step S912.

If there are a plurality of virtual device objects each including a printer object in which an application compatible port is assigned to an output port (YES in step S911), the process advances to step S912. In step S912, the virtual device object management unit 403 refers to information of printer objects assigned to the respective virtual device objects, and determines whether there is a virtual device object including a printer object for normal use. If there is a virtual device object including a printer object for normal use (YES in step S912), the process advances to step S914. In step S914, the virtual device object management unit 403 sets a virtual device object including the printer object for normal use as a recommended virtual device object, and ends the process.

If a virtual device object including a printer object for normal use does not exist (NO in step S912), the process advances to step S913. In step S913, the virtual device object management unit 403 selects one virtual device object from a plurality of virtual device objects. In this case, a recommended virtual device object has not been discriminated in previous processing. In this determination, one virtual device object is selected by the same processing as that described in step S908. The process then advances to step S914, and the virtual device object management unit 403 sets a virtual device object selected in step S913 as a recommended virtual device object. Thereafter, the process ends.

[Output Screen Display Processing Sequence]

As described with reference to FIG. 6, a virtual device object is formed from a printing printer object and FAX transmission printer object in the embodiment. When a print instruction is accepted from the user, print processing is executed using a device driver assigned for printing. When a FAX transmission instruction is accepted, FAX transmission processing is executed using a device driver assigned for FAX transmission.

Depending on the status of a device driver installed in the OS, only either the printing or FAX transmission device driver may be usable. In such a case, executable output processing is displayed on the GUI in output screen display processing so that the user can recognize it, thereby improving convenience.

FIG. 10 is a flowchart exemplifying an output screen display control processing sequence corresponding to a printer object assigned to a virtual device object. The processing example represented by this sequence is executed upon accepting an output operation to a virtual device object. The output operation is, for example, an operation of dragging a file to a virtual device object, as shown in FIG. 7A (701).

Upon accepting an output operation from the user, the input management unit 404 instructs the screen display management unit 405 to display an output screen. Upon receiving the instruction, the screen display management unit 405 inquires the virtual device object management unit 403 whether output is possible from a virtual device object for which the output instruction has been accepted. Then, the processing sequence starts.

In step S1001, the virtual device object management unit 403 refers to information of the virtual device object for which the output instruction has been accepted, and determines whether an available printing printer object has been assigned. If an available printing printer object has been assigned (YES in step S1001), the virtual device object management unit 403 sets printout "possible" from the virtual device object in step S1002. If no available printing printer object has been assigned (NO in step S1001), the virtual device object management unit 403 sets printout "impossible" from the virtual device object in step S1003.

In step S1004, the virtual device object management unit 403 refers to the information of the virtual device object, and determines whether an available FAX transmission printer object has been assigned. If an available FAX transmission printer object has been assigned (YES in step S1004), the virtual device object management unit 403 sets FAX transmission output "possible" from the virtual device object in step S1005. If no available FAX transmission printer object has been assigned (NO in step S1004), the virtual device object management unit 403 sets FAX transmission output "impossible" from the virtual device object in step S1006.

In step S1007, the virtual device object management unit 403 transfers the result of the determination processing to the screen display management unit 405, and instructs it to display an output screen. Upon receiving the instruction, the screen display management unit 405 refers to possible/impossible information of printout and FAX transmission output, and displays an output screen. At this time, if printout or FAX transmission output is impossible, a corresponding output selection display is presented while invalidating a GUI operation on the display on the output screen. This indicates graying out or hiding a display on the GUI so that it is identifiably displayed that an output operation from the user is not accepted. If output is possible, a corresponding output selection display is presented while validating a GUI operation on the display on the output screen.

As described in the explanation of the GUI with reference to FIG. 7, whether display is possible or not may be determined further using authentication information.

In the embodiment, even when both printing and FAX transmission device drivers are assigned or either one device driver is assigned, display of the virtual device object is the same. However, display of the virtual device object may be changed depending on the number or types of assigned device drivers.

As described above, according to the present invention, a virtual device object for more easily executing various output instructions to an image processing apparatus having a plurality of functions can be automatically generated without requiring a user instruction. In addition, the arrangement for the automatic generation can be easily implemented.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-031046, filed Feb. 15, 2012, which is hereby incorporated by reference herein in its entirety.

What is claimed is:

1. An information processing apparatus comprising:
a memory; and
a hardware processor that executes a computer program in the memory to control the information processing apparatus to function as units comprising:
(a) a selection unit configured to automatically select a first object and a second object from a plurality of objects corresponding to a plurality of device drivers based on output port information of the plurality of objects corresponding to the plurality of device drivers, wherein (i) the plurality of device drivers are installed in the information processing apparatus, (ii) the selected first object corresponds to a first device driver of a first output function of one multi-function apparatus of a plurality of multi-function apparatuses, and (iii) the selected second object corresponds to a second device driver of a second output function of the one multi-function apparatus of the plurality of multi-function apparatuses;
(b) a generating unit configured to generate a virtual device object to which both of the first object and the second object selected by the selection unit are assigned;
(c) a display unit configured to display, on a display device, the virtual device object generated by the generating unit; and
(d) an acceptance unit configured to accept an operation, operated by a user, of dragging a file onto the displayed virtual device object,
wherein when the acceptance unit accepts the operation, operated by a user, of dragging the file onto the virtual device object displayed by the display unit, the display unit further displays a first icon corresponding to the first output function and a second icon corresponding to the second output function,
wherein, when the acceptance unit further accepts an operation, operated by a user, of dropping the file to one of the first icon corresponding to the first output function and the second icon corresponding to the second output function, the display unit further displays a setting screen of a function corresponding to the dropped-to icon, and wherein the display unit displays only one virtual device object selected based on an object for normal use which is managed by an operating system of the information processing apparatus, the object for normal use being an object designated as a default in output processing by the operating system.

2. The information processing apparatus according to claim 1, wherein the output port information is defined in advance by the operating system of the information processing apparatus.

3. The information processing apparatus according to claim 1, wherein the first output function and second output function of the output apparatus are a print function and FAX transmission function, respectively.

4. The information processing apparatus according to claim 1, wherein when a user drags the file onto the virtual device object displayed on the display device, the display unit identifiably displays an output function usable by the user and an output function unusable by the user, out of a first output function and second output function corresponding to a first object and second object assigned to the virtual device object.

5. An information processing method comprising:
automatically selecting, by a processor, a first object and a second object from a plurality of objects corresponding to a plurality of device drivers based on output port information of the plurality of objects corresponding to the plurality of device driver, wherein the plurality of device drivers are installed in an information processing apparatus, and wherein the selected first object corresponds to a first device driver of a first output function of one multi-function apparatus of a plurality of multi-function apparatuses, and wherein the selected second object corresponds to a second device driver of a second output function of the one multi-function apparatus of the plurality of multi-function apparatuses;
generating, by the processor, a virtual device object to which both of the first object and the second object selected in the selecting step are assigned;
displaying, on a display device, the virtual device object generated in the generating step; and
accepting, by the processor, an operation, operated by a user, of dragging a file onto the displayed virtual device object,
wherein when the operation, operated by a user, of dragging the file onto the virtual device object displayed in the displaying step is accepted in the accepting step, a first icon corresponding to the first output function and a second icon corresponding to the second output function are further displayed,
wherein, when an operation, operated by the user, of dropping the file to one of the first icon corresponding to the first output function and the second icon corresponding to the second output function is further accepted in the accepting step, a setting screen of a function corresponding to the dropped-to icon is further displayed, and
wherein the displaying step displays only one virtual device object selected based on an object for normal use which is managed by an operating system of the information processing apparatus, the object for normal use being an object designated as a default in output processing by the operating system.

6. The information processing method according to claim 5, wherein the output port information is defined in advance by the operating system of the information processing apparatus.

7. The information processing method according to claim 5, wherein the first output function and second output function of the output apparatus are a print function and FAX transmission function, respectively.

8. The information processing method according to claim 5, wherein in the displaying step, when a user drags the file onto the virtual device object displayed on the display device, an output function usable by the user and an output function unusable by the user, out of a first output function and second output function corresponding to a first object and second object assigned to the virtual device object are identifiably displayed.

9. A non-transitory computer-readable medium storing a program causing a computer to function as units comprising:
(a) a selection unit configured to automatically select a first object and a second object from a plurality of objects corresponding to a plurality of device drivers based on output port information of the plurality of objects corresponding to the plurality of device drivers, wherein the plurality of device drivers are installed in the computer, and wherein the selected first object corresponds to a first device driver of a first output function of one multi-function apparatus of a plurality of multi-function apparatuses, and wherein the selected second object corresponds to a second device driver of a second output function of the one multi-function apparatus of the plurality of multi-function apparatuses,
(b) a generating unit configured to generate a virtual device object to which both of the first object and the second object selected by the selection unit are assigned,
(c) a display unit configured to display, on a display device, the virtual device object generated by the generating unit, and
(d) an acceptance unit configured to accept an operation, operated by a user, of dragging a file onto the displayed virtual device object,
wherein when the acceptance unit accepts the operation, operated by the user, of dragging the file onto the virtual device object displayed by the display unit, the display unit further displays a first icon corresponding to the first output function and a second icon corresponding to the second output function,
wherein, when the acceptance unit further accepts an operation, operated by the user, of dropping the file to one of the first icon corresponding to the first output function and the second icon corresponding to the second output function, the display unit further displays a setting screen of a function corresponding to the dropped-to icon, and
wherein the display unit displays only one virtual device object selected based on an object for normal use which is managed by an operating system of the computer, the object for normal use being an object designated as a default in output processing by the operating system.

10. The non-transitory computer-readable medium according to claim 9 wherein the output port information is defined in advance by the operating system of the computer.

11. The non-transitory computer-readable medium according to claim 9, wherein the first output function and second output function of the output apparatus are a print function and FAX transmission function, respectively.

12. The non-transitory computer-readable medium according to claim 9, wherein when a user drags the file onto the virtual device object displayed on the display device, the display unit identifiably displays an output function usable by the user and an output function unusable by the user, out of a first output function and second output function corresponding to a first object and second object assigned to the virtual device object.

* * * * *